United States Patent
Xu et al.

(10) Patent No.: US 12,261,827 B1
(45) Date of Patent: Mar. 25, 2025

(54) PROXY SERVERS FOR MANAGING QUERIES TO LARGE LANGUAGE MODELS

(71) Applicant: Auradine, Inc., Santa Clara, CA (US)

(72) Inventors: Tao Xu, Saratoga, CA (US); Barun Kar, Saratoga, CA (US)

(73) Assignee: Auradine, Inc., Santa Clara, CA (US)

( * ) Notice: Subject to any disclaimer, the term of this patent is extended or adjusted under 35 U.S.C. 154(b) by 0 days.

(21) Appl. No.: 18/417,186

(22) Filed: Jan. 19, 2024

(51) Int. Cl.
G06F 16/00 (2019.01)
G06F 40/35 (2020.01)
G06F 40/58 (2020.01)
H04L 9/40 (2022.01)
H04L 41/16 (2022.01)

(52) U.S. Cl.
CPC .......... H04L 63/0281 (2013.01); G06F 40/35 (2020.01); G06F 40/58 (2020.01); H04L 41/16 (2013.01)

(58) Field of Classification Search
CPC ............. G06F 2221/2101; G06F 21/16; G06F 2221/2147; G06F 2221/2137; G06F 2221/2143; G06F 2221/2105; G06F 2221/034; G06F 21/1078; G06F 2221/2135; G06F 2221/2151; G06F 21/109; G06F 2221/2149; G06F 2221/2141; G06F 21/1082; G06F 21/6245; G06F 16/211; G06F 16/951; G06F 16/285; G06F 16/9535; G06F 16/00; G06F 16/2282; G06F 16/24575; G06F 16/24578; G06F 16/955; G06F 17/00; G06F 19/325; G06F 7/00; G06F 16/90335; G06F 16/958; G06F 16/683; G06F 16/7847; G06F 2209/463; G06F 3/00; G06F 9/46; G06F 9/465; G06F 9/541; G06F 16/2425; G06F 16/2471; G06F 16/248; G06F 16/313; G06F 16/358; G06F 16/95; G06F 17/40; G06F 2216/11; G06F 2217/06; G06F 2221/2145; H04L 2463/101; H04L 2463/102
See application file for complete search history.

(56) References Cited

U.S. PATENT DOCUMENTS 11,876,858 B1  1/2024  Nair et al.
2022/0311805 A1  9/2022  Talati et al.
(Continued)

OTHER PUBLICATIONS

U.S. Appl. No. 18/508,861, filed Nov. 14, 2023, Ananthakrishnan.

*Primary Examiner* — Yicun Wu
(74) *Attorney, Agent, or Firm* — Fish & Richardson P.C.

(57) ABSTRACT

Systems, methods, and apparatus, including computer programs encoded on a computer storage medium for managing network traffic to and from a server configured to: (i) receive, from a client device, a query in a natural language, and (ii) generate a response to the query in the natural language. In one aspect, a method includes: receiving, from the client device via a network connection, a network message including a new query for the server; processing the new query, using a text encoder, to generate an embedding vector of the new query; identifying, from amongst multiple entries of a vector database, a particular entry based on a similarity metric between: (i) the embedding vector of the new query, and (ii) an embedding vector of a particular query stored in the particular entry; and determining whether the similarity metric is greater than a threshold similarity value.

15 Claims, 11 Drawing Sheets

(56) References Cited

U.S. PATENT DOCUMENTS

| | | | |
|---|---|---|---|
| 2023/0135179 A1* | 5/2023 | Mielke | G06N 5/022 |
| | | | 704/232 |
| 2023/0245654 A1* | 8/2023 | Shrivastava | G10L 15/1822 |
| | | | 704/243 |
| 2023/0315856 A1* | 10/2023 | Lee | G06F 40/30 |
| 2024/0078337 A1 | 3/2024 | Kamyshenko et al. | |
| 2024/0144192 A1* | 5/2024 | Weissenberger | G06F 3/0482 |
| 2024/0155024 A1* | 5/2024 | Palladino | G06F 8/73 |

\* cited by examiner

PROXY SERVERS FOR MANAGING QUERIES TO LARGE LANGUAGE MODELS

TECHNICAL FIELD

This disclosure relates generally to systems, methods, and apparatus for implementing proxy servers that can manage network traffic to and from web servers hosting neural networks, e.g., large language models (LLMs).

BACKGROUND

Communications between end users (e.g., client devices) and remote applications, such as those hosted by web servers, are often computationally expensive and susceptible to cyber-attacks, e.g., denial-of-service (DOS) attacks. The computational resources expended by such web servers, as well as their vulnerability to cyber-attacks, can be even greater when these web servers employ applications that process natural language data, e.g., large language models (LLMs) and other generative artificial intelligence (GenAI) applications.

SUMMARY

The present disclosure describes systems, methods, and apparatus for a proxy server implemented as computer programs on one or more computers for managing network traffic to and from one or more web servers hosting neural networks, e.g., large language models.

The proxy server is deployed between client devices and the remote web servers that the client devices communicate with to use large language model (LLM) applications, e.g., generative artificial intelligence (GenAI) applications, hosted on the web servers. The proxy server can be implemented as a reverse proxy (or surrogate proxy) for a web server to provide network traffic security and load balance for the web server. Particularly, the proxy server is hosted in a network (e.g., the internet) and manages network connections between client devices and the web server, such that the client devices are generally not aware that a proxy server is present. For example, the proxy server can receive a query from a client device (e.g., via a network connection) and determine whether to forward the query to the web server or respond to the query directly using a cached response. In either case, a response to a query appears, to a client device, to have been generated from the LLM hosted on the web server. The proxy server can significantly reduce the number of new queries that an LLM processes by using cached responses to past queries that are contextually similar to the new queries, e.g., queries including text that is phrased differently but include the same contextual information. For example, in some implementations, the proxy server can respond to 80% or more, 85% or more, 90% or more, 95% or more of new queries to an LLM hosted on a web server, which can eliminate redundant, resource intensive computations by the web server and significantly improving the efficiency of natural language processing tasks performed by the LLM; reduce the consumption of network resources due to communications between the proxy server and the web server; or improve the speed of response to the new queries, or any combination thereof.

The proxy server can be implemented by processing units realized using field-programmable gate arrays (FPGAs), application-specific integrated circuits (ASICs), or other dedicated hardware to manage natural language data traffic between the client devices and the web servers hosting LLM applications. The proxy server can be configured as a central server in a central location (e.g., a data center) or a cloud server distributed over multiple locations (e.g., multiple data centers). The client devices can be used by end users of an LLM that interface through an application programming interface (API) configured to communicate with the LLM, e.g., provide software interfaces that allow an end user to input a query and view a corresponding response to the query. End users can include individual users and/or entities (e.g., employees) of an enterprise that may be incorporating LLM applications into their daily activities and/or workflow.

These and other features related to the systems, methods, and apparatus described herein is summarized below.

In general, according to a first aspect, a method performed by one or more computers for managing network traffic to and from a server is described.

The server is configured to: (i) receive, from a client device, a query in a natural language, and (ii) generate a response to the query in the natural language. In some implementations, the server hosts a neural network and is configured to process the query, using the neural network, to generate the response to the query. For example, the neural network can be a Transformer model such as a large language model.

The method includes: receiving, from the client device via a network connection, a network message including a new query for the server, where the one or more computers are communicatively coupled to the server; processing the new query, using a text encoder, to generate an embedding vector of the new query; identifying, from amongst multiple entries of a vector database, a particular entry based on a similarity metric between: (i) the embedding vector of the new query, and (ii) an embedding vector of a particular query stored in the particular entry, where each of the multiple entries includes: (i) an embedding vector of a respective query, and (ii) a corresponding response to the respective query; and determining whether the similarity metric is greater than a threshold similarity value.

In some implementations of the method, the text encoder is a pre-trained neural network.

In some implementations, the method further includes, upon determining that the similarity metric is greater than the threshold similarity value: retrieving, from the particular entry, a response to the particular query.

In some implementations, the method further includes, upon determining that the similarity metric is greater than the threshold similarity value: sampling, from a distribution of random numbers, a random number; and determining whether the random number is greater than a threshold number. For example, the distribution of random numbers can be a uniform distribution.

In some implementations of the method, each of the multiple entries further includes a respective hit rate characterizing a frequency at which the respective response is retrieved from the entry.

In some implementations, the method further includes, upon determining that the similarity metric is greater than the threshold similarity value, and before determining whether the random number is greater than the threshold number: updating a hit rate for the particular entry; and generating the threshold number based on the hit rate for the particular entry. For example, the threshold number can be inversely proportional to the hit rate for the particular entry.

In some implementations, the method further includes, upon determining that the random number is greater than the threshold number: transmitting, to the client device via the network connection, a network message including the response to the particular query.

In some implementations, the method further includes, upon determining that the random number is not greater than the threshold number: transmitting, to the server, the new query; receiving, from the server, a response to the new query; processing the responses to the new and particular queries, using the text encoder, to generate embedding vectors of the responses to the new and particular queries; calculating a second similarity metric between: (i) the embedding vector of the response to the new query, and (ii) the embedding vector of the response to the particular query; and determining whether the second similarity metric is greater than a second threshold similarity value.

In some implementations, the method further includes, upon determining that the second similarity metric is greater than the second threshold similarity value: transmitting, to the client device via the network connection, a network message including the response to the new or particular queries.

In some implementations, the method further includes, upon determining that the second similarity metric is not greater than the second threshold similarity value: storing, in the particular entry, the response to the new query; and transmitting, to the client device via the network connection, a network message including the response to the new query.

In some implementations, the method further includes, upon determining that the second similarity metric is not greater than the second threshold similarity value: marking the particular entry as non-cacheable.

In some implementations of the method, identifying, from amongst the multiple entries of the vector database, the particular entry based on the similarity metric includes: performing, with respect to the embedding vector of the new query, a vector search on the embedding vectors of the queries stored in the multiple entries; and identifying, from the vector search, the particular entry as the respective entry having the similarity metric with a greatest respective value. For example, the vector search can be a k-nearest-neighbors search such as a Hierarchical Navigable Small World (HNSW) search or an Inverted File Index (IVF) search.

In some implementations, the method further includes, upon determining that the similarity metric is not greater than the threshold similarity value: transmitting, to the server, the new query; receiving, from the server, a response to the new query; storing, in a new entry of the vector database, (i) the embedding vector of the new query, and (ii) the response to the new query; and transmitting, to the client device via the network connection, a network message including the response to the new query.

According to a second aspect, a system including one or more computers and one or more storage devices communicatively coupled to the one or more computers is described. The one or more storage devices store instructions that, when executed by the one or more computers, cause the one or more computers to perform operations of any of the abovementioned methods.

According to a third aspect, a system including one or more non-transitory computer storage media is described. The one or more non-transitory computer storage media store instructions that, when executed by one or more computers, cause the one or more computers to perform operations of any of the abovementioned methods.

The novel features described above and in the following sections of this specification provide an effective means for managing network traffic to and from web servers hosting large language models (LLMs), allowing them to be implemented in a manner that is computationally fast, efficient, cost effective, and less vulnerable to cyber-attacks.

The details of one or more disclosed implementations are set forth in the accompanying drawings and the description below. Other features, aspects, and advantages will become apparent from the description, the drawings, and the claims.

DETAILED DESCRIPTION

Generative artificial intelligence (GenAI) is an AI technology, based on large language models (LLMs), which is gaining popularity and adoption at a rapid rate, driving productivity, analytics, and entertainment, among others, across multiple verticals such as healthcare, technology, banking, and retail. However, this technology generally involves sophisticated hardware, e.g., large tensor processing unit (TPU) and/or graphics processing unit (GPU) clusters, as well as natural language processing that brings with it various issues. These issues include slow, costly, and resource intensive computations, as well as vulnerability to cyber-attacks (e.g., denial-of-service (DOS) attacks). Although AI technology is promising, due to these issues, it has generally remained impractical (or infeasible) to deploy at scale for end users to integrate into their workflow and/or daily routines. Hence, it would be useful to have solutions, e.g., for enterprises that enable its end users to use GenAI applications, that mitigate these issues in a way that is easy to adopt and implement, is efficient, highly available, scalable, and effective.

The disclosed proxy server provides a solution to some or all of these abovementioned issues. The proxy server is configured for easy insertion and the capability to evolve in a dynamical environment. Particularly, the proxy server can be deployed in a network between end user client devices and remote web servers hosting LLM applications to manage network traffic therebetween. In some implementations, the proxy server is deployed as a man-in-the-middle between end user client devices and remote web server applications that the users are communicating with. In such implementations, the proxy server acts as a reverse proxy (or surrogate proxy) for a web server, providing network traffic security and load balance for the web server.

These and other features of the present disclosure are described in more detailed below.

Figure 1:
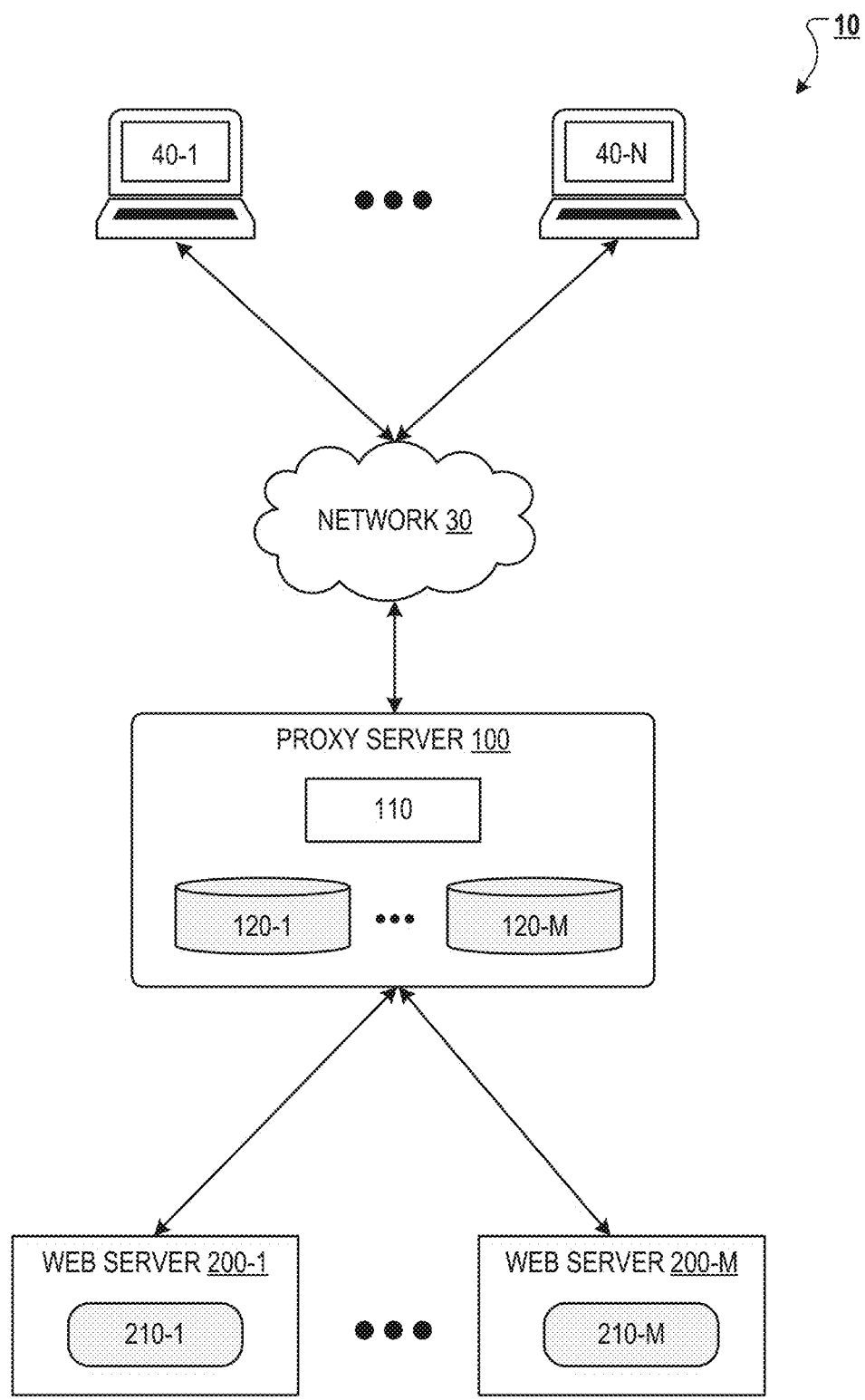
FIG. 1 is a schematic diagram of an example communications system including one or more client devices communicating with one or more web servers via a network and a proxy server.

FIG. 1 is a schematic diagram of an example communications system 10. The communications system 10 includes: (i) one or more client devices 40-1 through 40-N (referred to generally as client devices 40), (ii) one or more web servers 200-1 through 200-M (referred to generally as web servers 200), (iii) a network 30 for providing bidirectional communications between the client devices 40 and the web servers 200, and (iv) a proxy server 100 that is communicatively coupled between the client devices 40 and the web servers 200. Particularly, the proxy server 100 is positioned in the network 30 for managing queries from the client devices 40 to the web servers 200.

Each web server 200 hosts a respective neural network 210 that is configured to process natural language data to perform natural language processing tasks. In most cases, the neural networks 210 are LLMs which are typically implemented as Transformer-based neural networks, but other types of neural networks that process natural language data may also be hosted by the web servers 200, e.g., recurrent neural networks, convolutional neural networks, attention neural networks, combinations thereof, etc. Hence, the neural networks 210 hosted on the web servers 200 are generally large models, having a large number of parameters, and trained on large training datasets of natural language text and/or speech corpora. For instance, LLMs can include billions, tens of billions, hundreds of billions, trillions, or more parameters and can be trained on text-based data sets as large as the entire internet. Examples of LLMs that have been deployed for public use include Bidirectional Encoder Representations from Transformers (BERT) developed by Google, Generative Pre-trained Transformer (GPT) families developed by OpenAI, Large Language Model Meta AI (LLaMa) developed by Meta, among others.

In general, each web server 200 is configured to receive a query in a natural language and process the query, using its respective neural network 210, to generate a response to the query in the natural language. As described herein, a query can be a sequence of text tokens (e.g., a sequence of words) in the natural language. These include, but are not limited to, text prompts, text documents, and other pieces or portions of text. A response to a query can also be a sequence of text tokens in the natural language. In some examples, a query recites a question and a response to the query recites an answer (or approximate answer) to the question. More generally, a query can recite a natural language processing task to be performed and a response to the query can recite one or more results (or approximate results) of the natural language processing task. The types of queries and responses that are processed and generated by the neural networks 210 generally depends on their respective architectures and training regimes. The proxy server 100 is agnostic to these features and can manage queries and responses for any such neural networks 210.

Note, the web servers 200 may perform other tasks and host other applications besides LLM and natural language processing applications. However, the present disclosure is primarily directed at systems, methods, and apparatus for managing queries to the neural networks 210 hosted by the web servers 200. Accordingly, other operations of the web servers 200 will not be elaborated on herein. Further, a neural network 210 can also be configured to output in a different language than the input language, e.g., performing machine translation simultaneously with question-answering. Such situations can be handled straightforwardly using the systems, methods, and apparatus described herein. However, for ease of description, it will be assumed that a neural network 210 receives queries and generates responses in the same language—a separate module of the neural network 210, the web server 200 hosting the neural network 210, the proxy server 100, and/or a client device 40 can perform the machine translation step if desired. For reference, a natural language (or ordinary language) can be understood as a language developed by humans to communicate, e.g., English, Chinese, French, Russian, etc. This can be contrasted with a programming language that is developed for computers to communicate, e.g., Python, C++, Java, etc.

Each client device 40 communicates with the web servers 200 via the network 30 and the proxy server 100. In general, each client device 40 is configured to transmit a query to an application hosted by a web server 200 and receive a response to the query. Client devices 40 can transmit queries intended for any of the neural networks 210 hosted by their respective web servers 200 and receive responses which, as described in more detail below, may be provided by the proxy server 100 as a cached response or newly generated by a web server 200. The network 30 is typically a wide area network (WAN) such as the internet, but other networks can also be implemented, e.g., metropolitan area networks (MANs), campus area network (CANs), local area network (LANs), etc. An end user can input a query through an application programming interface (API) installed on a client device 40 and receive a response to the query through the API. A respective API can be configured for each neural network 210 and web server 200. Examples of client devices 40 include, but are not limited to, laptops, computers, smartphones, tablets, smart watches, or any other user device that can utilize such APIs.

The proxy server 100 is deployed in the network 30 between the client devices 40 and the (remote) web servers 200. At a high level, the proxy server 100 includes: (i) a text encoder 110, and (ii) one or more vector databases 120-1 through 120-M. The proxy server 100 uses the combination of the text encoder 110 and the one or more vector databases 120 to understand, organize, reference, and evaluate information derived from natural language data. The proxy server 100 can be configured as a central server in a central location (e.g., a data center) or a cloud server distributed over multiple locations (e.g., in multiple data centers).

In some implementations, the proxy server 100 is similar to, or is associated with, a security gateway as described in U.S. Application No. 63/538,718, which is incorporated by reference in its entirety for all purposes. In such implementations, operations of the proxy server 100 and a security gateway as described in U.S. Application No. 63/538,718 are performed by the same server hardware, or by a separate proxy server and security gateway hardware operating in tandem. In either scenario, in such implementations, the communications system 10 provides proxy server operations as described in this disclosure, along with security operations as described in U.S. Application No. 63/538,718. Further, in such implementations, the communications system 10 includes a policy server as described in U.S. Application No. 63/538,718. However, the implementations in this disclosure describe operations of a proxy server 100 for managing network traffic to and from one or more web servers 200 hosting neural networks 210 such as LLMs, e.g., by processing queries from client devices 40 and determining whether to forward the queries to a web server 200 or respond directly using cached responses, without describing security operations as disclosed in U.S. Application No. 63/538,718.

The proxy server 100 uses the text encoder 110 to process queries received from the client devices 40 to generate embedding vectors of the queries. As used herein, a "a query vector" refers to an embedding vector of a query. The proxy server 100 can determine the contextual similarities between two queries based on their query vectors, e.g., to determine if two queries that are phrased differently have substantially the same information, e.g., ask the same question. Analogously, the proxy server 100 can use the text encoder 110 to process responses to queries received from the web servers 200 to generate embedding vectors of the responses. As used herein, a "response vector" refers to an embedding vector of a response to a query. The proxy server 100 can determine the contextual similarities between two responses based on their response vectors, e.g., to determine if two responses that are phrased differently have substantially the same information, e.g., provide the same answer to the same question (or two contextually similar questions).

The proxy server 100 stores embedding vectors of queries and the respective responses to such queries in the vector database(s) 120 which it can then pull from to respond to new queries that are contextually similar to past queries. In some implementations, there are multiple proxy servers 100, with each managing queries for a different associated web server 200, forming a respective query management system for the respective proxy server and the respective web server. In such implementations, a proxy server 100 includes a respective vector database 120 dedicated to the respective web server 200.

In some implementations, one or more proxy servers 100 manage queries for multiple web servers 200. In such implementations, a proxy server 100 maintains a single vector database 120 for the multiple associated web servers 200, allowing the proxy server 100 to "mix" responses received from the web servers 200. In other implementations, the proxy server 100 maintains a respective vector database 120-1 through 120-M for each associated web server 200-1 through 200-M to isolate the responses received from each web server 200. For ease of description, and without loss of generality, the following description is with respect to a single proxy server 100 that maintains a respective vector database 120, or equivalently separate partitions of a single vector database, for each web server 200.

In some implementations, each web server 200 is associated with (e.g., owned and/or managed by) a different respective enterprise that are independent of one another. In some implementations, two or more web servers 200 are associated with a common enterprise entity. In some implementations, the proxy server 100 is associated with an enterprise entity that is distinct from enterprises associated with the web servers 200. In such implementations, the enterprise entity associated with the proxy server 100 has contractual or other relationship agreements with the enterprises associated with the web servers 200, which enables the proxy server 100 to manage queries directed to the web servers 200. In some implementations, the proxy server 100 is associated with an enterprise entity that is also associated with one or more of the web servers 200. This can be the case, for example, when different proxy servers 100 each manage queries for different associated web servers 200 forming respective query management systems for the respective proxy server 100 and the respective web server(s) 200.

Suitable combinations of the above associations are also possible. For example, in some implementations, a proxy server 100 manages queries for multiple web servers 200, while a different proxy server 100 manages queries for a single associated web server 200. In some implementations, a proxy server 100 and at least one web server 200 are associated with a common enterprise, where the proxy server 100 also manages queries for one or more other web servers 200 that are associated with different enterprises.

Without loss of generality, the following description is with respect to a proxy server 100 that manages queries directed to a web server 200, where the association between the proxy server 100 and the web server 200 is one of the associations noted above.

Figure 2A:
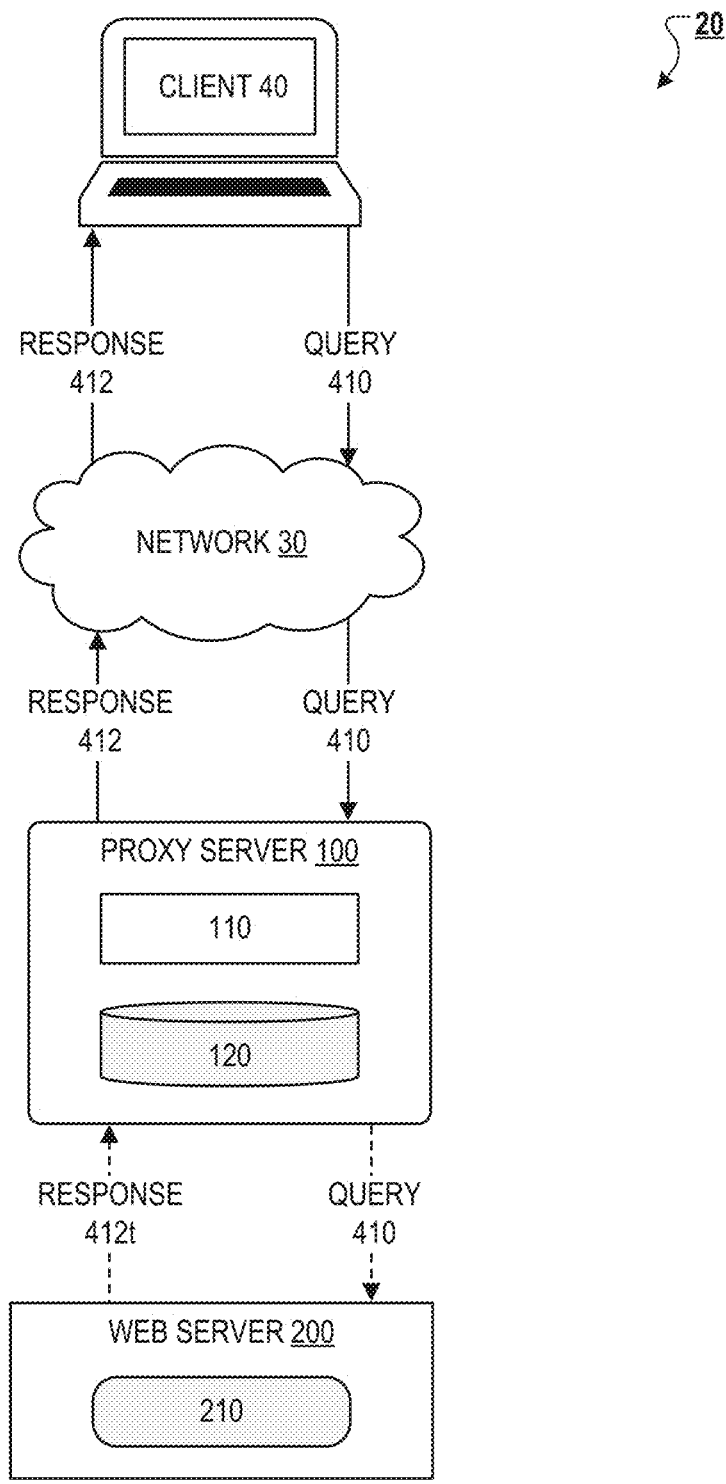
FIG. 2A is a schematic diagram of a portion of an example communications system including a client device communicating with a web server through a proxy server that manages queries directed to the web server.
Figure 2B:
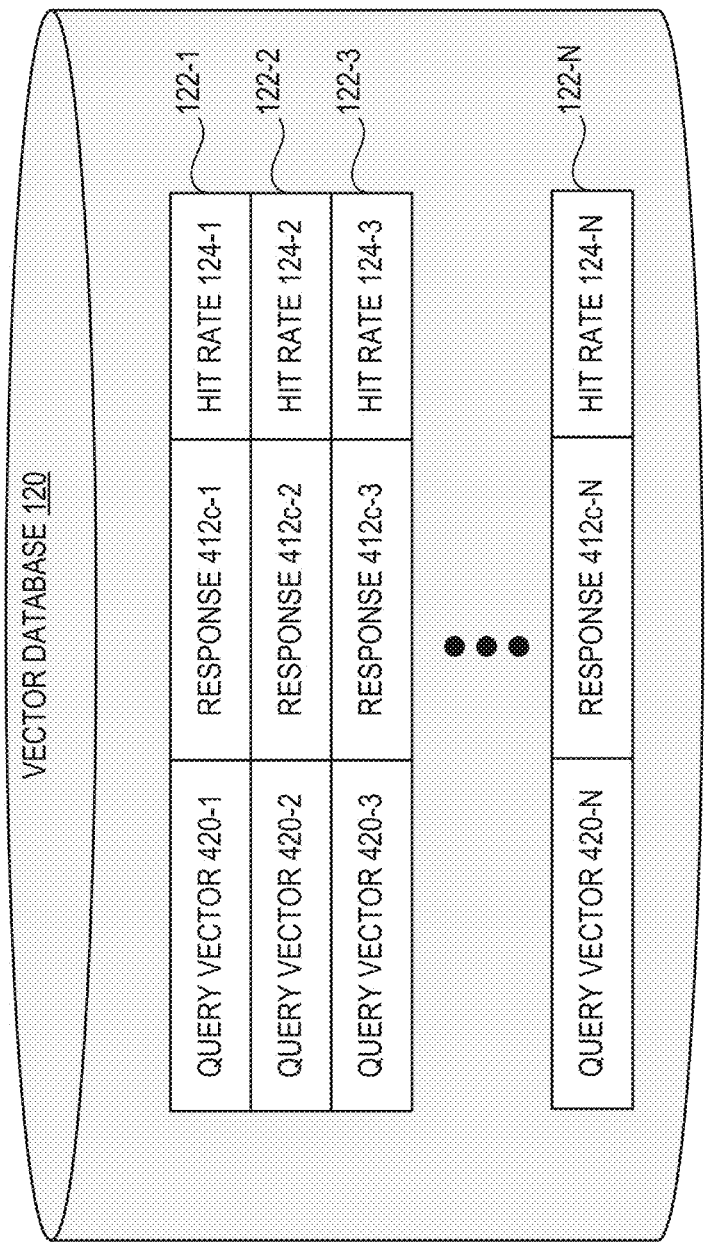
FIG. 2B is a schematic diagram of an example vector database hosted on a proxy server.
Figure 2C:
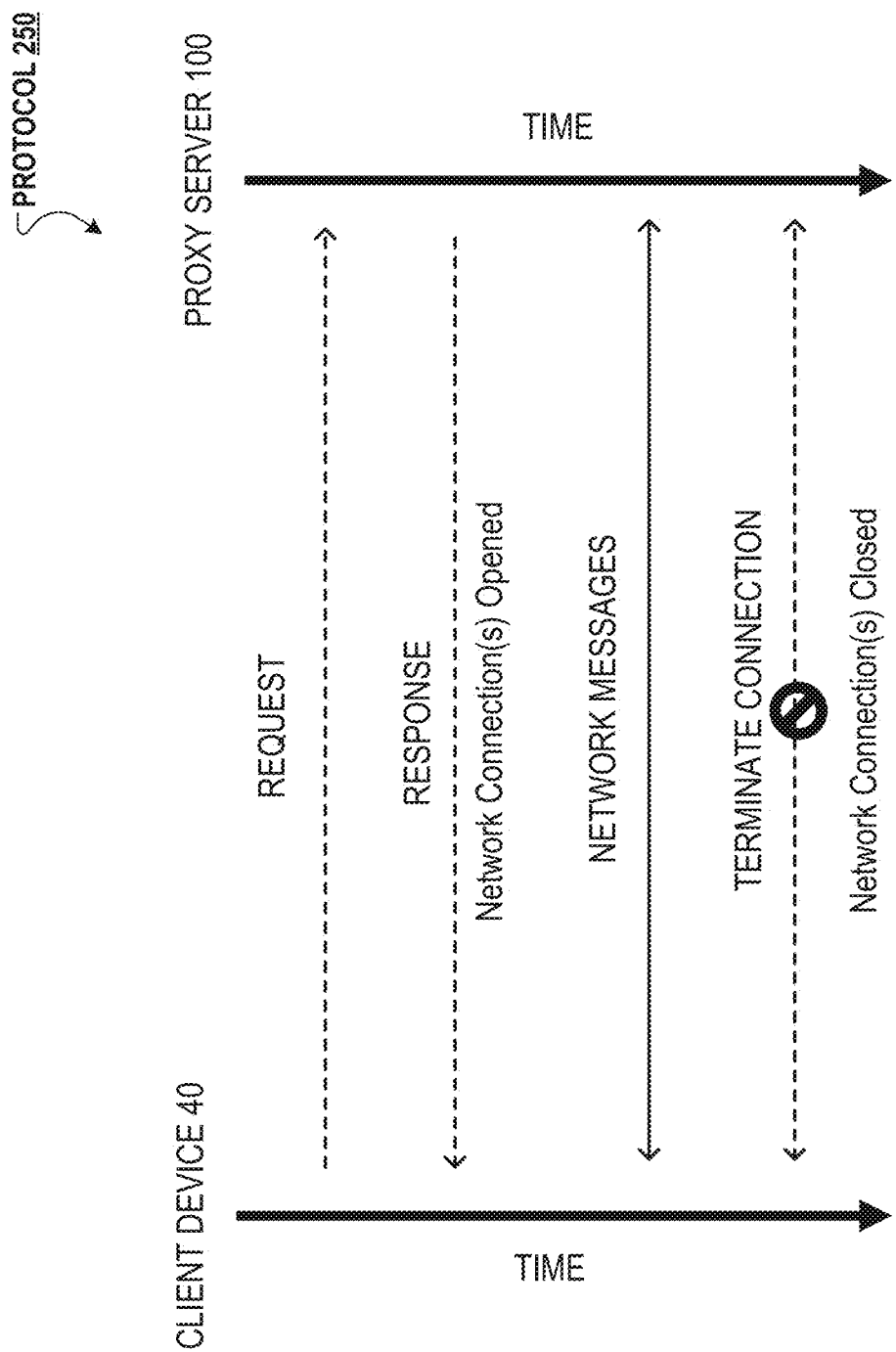
FIG. 2C shows a diagram of an example protocol for establishing a network connection between a client device and a proxy server.

FIG. 2A is a schematic diagram of a portion 20 of the communications system 10 that includes a client device 40 communicating with a web server 200 through the proxy server 100, such that the proxy server 100 manages queries directed to the web server 200. FIG. 2B is a schematic diagram of a vector database 120 hosted on the proxy server 100 for the web server 200. FIG. 2C is a diagram of an example protocol 250 for establishing a network connection between the client device 40 and the proxy server 100. In the examples of FIGS. 2A-2C, the proxy server 100 is implemented as a reverse proxy (or surrogate proxy) for the web server 200 to handle network connections with the client device 40 and communications therebetween. Note, the proxy server 100 may not be visible to the client device 40. That is, a response 412 to a query 410 may appear to originate from the web server 200 but is transmitted to the client device 40 by the proxy server 100.

Referring to FIG. 2C, to establish a network connection with the client device 40, the proxy server 100 can employ an internet protocol 250 such as a Websocket or HTTPS protocol, generating a Transmission Control Protocol (TCP) connection with full-duplex communication, e.g., facilitating bidirectional network messages. The internet protocol 250 can proceed as follows. The client device 40 can first issue a handshake request to the web server 200 which is handled by the proxy server 100. This initiates a handshaking protocol (e.g., HTTP). The handshake request can include the domain name of the web server 200, a hash key, and a network address of the client device 40, e.g., a network (e.g., IP) address generated by a network provider of the network 30. If the proxy server 100 accepts the handshake request (e.g., based on the network address of the client device 40), the proxy server 100 issues a handshake response to the client device 40 which upgrades the handshaking protocol to a bidirectional protocol (e.g., TCP), establishing a network connection. For example, the handshake response can include an upgrade prompt (e.g., an HTTP upgrade header) and a hash value generated by the proxy server 100 via hashing the hash key. The client device 40 and web server 200 can then communicate securely with each other via network messages (that include queries 410 or responses 412) through the proxy server 100 over the network connection, such that the proxy server 100 handles all incoming and outgoing network messages to and from the client device 40, as well as any network messages to and from the web server 200.

Returning to FIG. 2A, after establishing the network connection with the client device 40, the proxy server 100 can then use the text encoder 110 and vector database 120 to determine whether to forward queries 410 from the client device 40 to the web server 200, respond to such queries 410 itself using cached responses 412c in the vector database 120, probe the web server 200 for true responses 412t to the queries 410 (or other information regarding the current state of the neural network 210), among other operations.

In more detail, the text encoder 110 establishes the "embedding model" for the proxy server 100. Particularly, the text encoder 110 is configured to encode natural language entities (e.g., sequences of text tokens) into embedding vectors that represent the contextual context of such entities in an embedding space—a multidimensional vector space. Higher dimensional embedding spaces (e.g., embedding spaces with 10, 25, 50, 100, 200, 500, 1000 or more dimensions) can provide more granularity, e.g., encoding more contextual features of the natural language data. In general, the text encoder 110 can encode to any dimensional embedding space, e.g., corresponding to a particular number of contextual features in natural language data the proxy server 100 wishes to capture. Note, an embedding vector of an entity can also be referred to as an encoded representation of the entity that provides a computationally amenable representation for processing. An embedding vector can be a set or array of values (e.g., in UNICODE or Base64 encoding), alphanumeric values, symbols, or any convenient encoding. Examples of different encodings include, but are not limited to, Index-Based Encoding, Bag of Words (BOW) encoding, Term Frequency-Inverse Document Frequency (TF-IDF) Encoding, Word2Vector Encoding, BERT Encoding, among others. In some implementations, the text encoder 110 is a pre-trained neural network (e.g., a self-attention neural network) that has been trained on natural language text and/or speech corpora. Pre-trained text encoders are generally adept at encoding the contextual information of natural language data. Examples of such pre-trained natural language text encoders include, but are not limited to, T5 text encoders (e.g., T5-XXL), CLIP text encoders, among others.

The vector database 120 includes multiple entries 122-1 through 122-N. Each entry 122 includes: (i) an embedding vector 420 of a respective query 410, (ii) a corresponding (cached) response 412c to the respective query 410, and (iii) a respective hit rate 124 characterizing a frequency at which the respective response 412c is retrieved from the entry 122. For ease of description, the entries 122 are shown in FIG. 2B as being organized in a one-dimensional array. However, the entries 122 are generally organized within the vector database 120 according to the positions of their query vectors 420 in the embedding space, e.g., in a multidimensional array with the same dimension as the embedding space. Hence, entries 122 including query vectors 420 that are similar to one another can be arranged nearest one another, e.g., according to a cosine similarity or inverse distance metric. This can significantly increase the speed of vector searches the proxy server 100 performs on the vector database 120, e.g., such that not every query vector 420 stored in an entry 122 needs to be evaluated like in a brute force search.

After the proxy server 100 has stored a sufficiently large number of cached responses 412c in the vector database 120, as well as the embedding vectors 420 of their corresponding queries 410, the proxy server 100 can then begin responding to new queries using the cached responses 412c. Such operations are described in more detail below with reference to FIGS. 3A-3C.

Figure 3A:
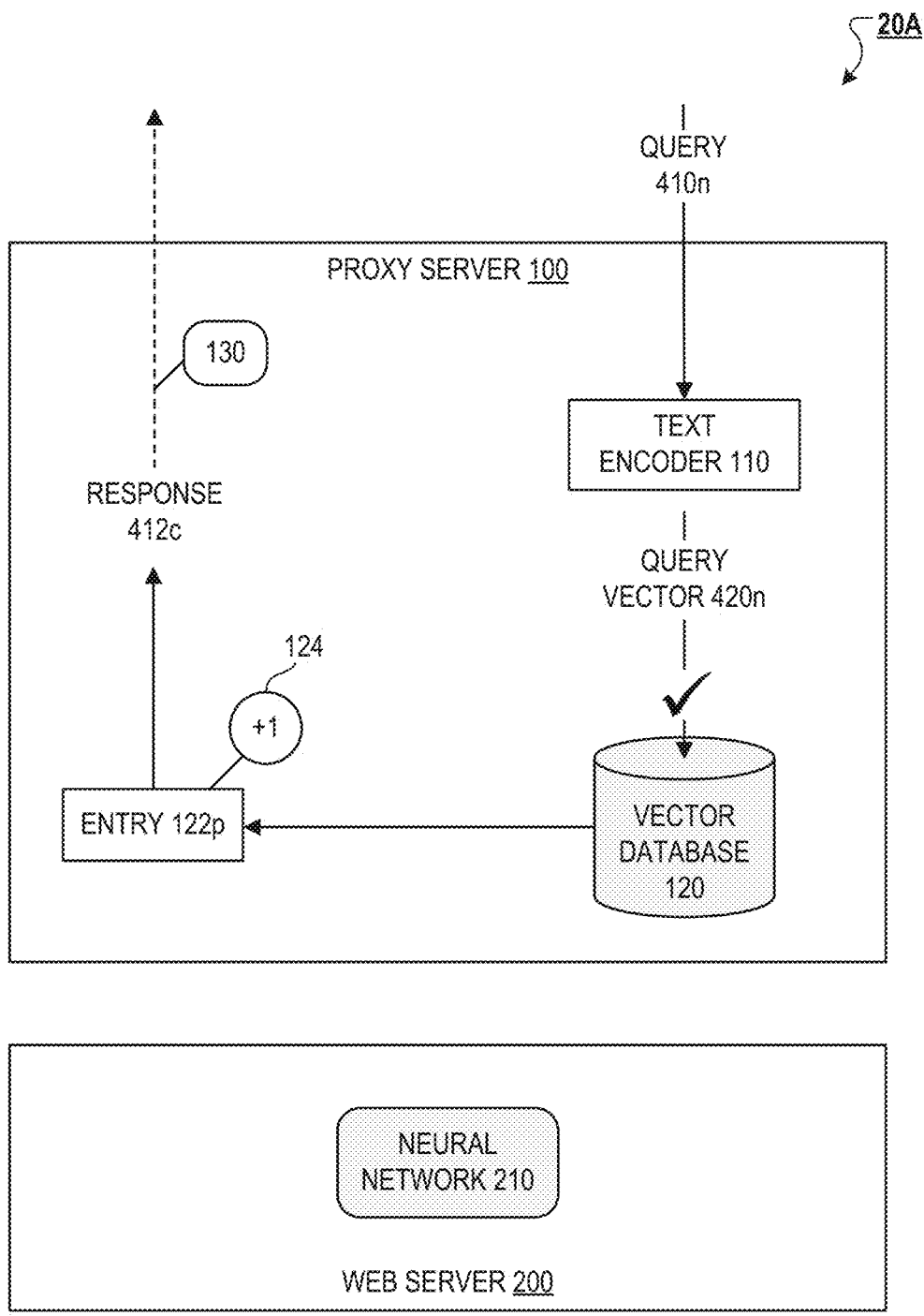
FIGS. 3A-3C are schematic diagrams of a proxy server responding to new queries directed to a web server via various protocols.

FIG. 3A is a schematic diagram showing an example protocol 20A for when the proxy server 100 registers a hit in the vector database 120.

Here, the proxy server 100 receives a new query 410n from a client device 40. The proxy server 100 processes the new query 410n, using the text encoder 110, to generate an embedding vector 420n of the new query 410n. Proxy server 100 then performs a vector search on the vector database 120 with respect to the new query vector 420n. Proxy server 100 identifies, from the vector search, a particular entry 122p in the vector database 120 that includes a query vector 420p that is similar to the new query vector 420n, as measured by a query similarity metric. As used herein, a query similarity metric refers to a similarity metric between the embedding vectors of two different queries, i.e., a similarity metric between two query vectors. The vector search may evaluate multiple entries 122, but not necessarily all entries 122, before converging on the particular entry 122p having the query similarity metric with the greatest respective value. Examples of vector search algorithms that can be performed by the proxy server 100 include, but are not limited to, k-nearest-neighbor searches such as Hierarchical Navigable Small World (HNSW) searches and Inverted File Index (IVF) searches.

The proxy server 100 determines that the query similarity metric for the particular entry 122p is greater than a threshold query similarity value. The proxy server 100 then retrieves the cached response 412c stored in the particular entry 122p and updates the hit rate 124 for the particular entry 122p. The proxy server 100 can then transmit the cached response 412c to the client device 40 in response to the new query 410n.

The threshold query similarity value is a configurable value that specifies the minimum level of contextual similarity for the proxy server 100 to respond to the new query 410n with the cached response 412c. For example, the threshold query similarity value can be set and/or adjusted for the web server 200 based on the percentage of new queries that an owner (e.g., an enterprise) of the web server 200 wishes the proxy server 100 to respond to, e.g., 80% or more, 85% or more, 90% or more, 95% or more of new queries. In general, higher threshold query similarity values reduce the percentage of new queries the proxy server 100 will respond to with cached responses, while lower threshold query similarity values increase the percentage. Lower threshold query similarity values can substantially reduce the number of redundant computations performed by the neural network 210, as well as increase the speed and volume of queries that can be handled by the proxy 100 and web 200 servers, since the proxy server 100 can respond to a significant majority of new queries.

Alternatively, or in addition, the proxy server 100 can decide whether to forward the new query 410n to the web server 200. In this case, the proxy server 100 samples a random number 130 from a distribution of random numbers, e.g., a uniform distribution from 0 to 1. If the random number 130 is greater than a threshold number (e.g., a number between 0 and 1), the proxy server 100 transmits the cached response 412c to the client device 40 and does not forward the new query 420n to the web server 200. If the random number 130 is not greater than the threshold number, the proxy server 100 forwards the new query 410n to the web server 200 and then proceeds via the protocol 20B of FIG. 3B. This procedure allows the proxy server 100 to periodically refresh the cached responses stored in the entries 122 of the vector database 120, e.g., if the neural network 210 is continuously fine-tuned on new training data.

The threshold number is a configurable value that specifies the percentage of new queries that are forwarded to the web server 200 when the proxy server 100 registers a hit in the vector database 120. For example, the threshold number can be set and/or adjusted for the web server 200 based on the percentage of new queries that an owner (e.g., an enterprise) of the web server 200 wishes the proxy server 100 to forward to the web server 200, e.g., 20% or less, 15% or less, 10% or less, 5% or less, 1% or less, 0.1% or less, 0.01% or less, 0.001% or less of new queries. Alternatively, or in addition, the threshold number can be generated by the proxy server 100 based on the hit rate 124 for the particular entry 122p identified in the vector database 120, e.g., inversely proportional to the hit rate 124. This allows the proxy server 100 to adjust the fraction of contextually similar queries that are forwarded to the web server 200, e.g., if such contextually similar queries are frequently received by the proxy server 100.

Figure 3B:
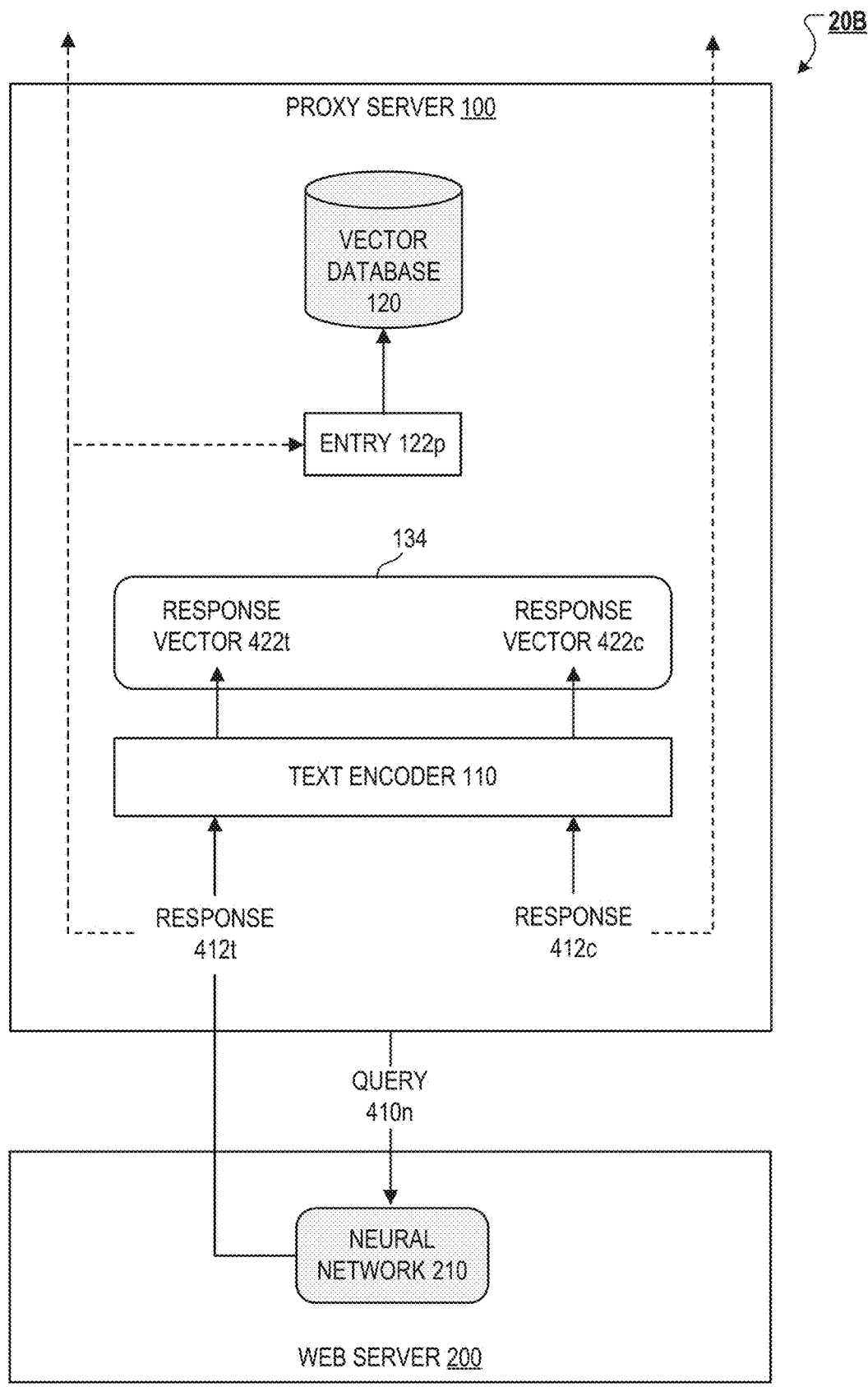

FIG. 3B is a schematic diagram showing an example protocol 20B for when the proxy server 100 registers a hit in the vector database 120 and forwards the new query 410n to the web server 200.

The proxy server 100 receives a true response 412t to the new query 10n, from the web server 200, that was generated by the neural network 210. The proxy server 100 then processes the cached 412c and true 412t responses, using the text encoder 110, to generate embedding vectors 422c and 422t of the cached 412c and true 412t responses. The proxy server 100 then compares the response vectors 422c and 422t using a response similarity metric 134. As used herein, a response similarity metric refers to a similarity metric between the embedding vectors of two different responses, i.e., a similarity metric between two response vectors.

The proxy server 100 determines whether the response similarity metric 134 is greater than a threshold response similarity value. If the response similarity metric is greater than the threshold response similarity value, the proxy server 100 transmits the cached 412c or true 412t response to the client device 40, as both are generally contextually similar to one another. If the response similarity metric is not greater than the threshold response similarity value, the proxy server 100 stores the true response 412t in the particular entry 122p and transmits the true response 412t to the client device 40. The proxy server 100 may also mark the particular entry 122p as non-cacheable, e.g., such that whenever the particular entry 122p is identified in the vector database 120, a new query is automatically forwarded to the web server 200. In these cases, the particular entry 122p may correspond to a set of contextually similar queries that generate contextually dissimilar responses from the web server 200, e.g., due to anomalies or bugs in the neural network 210, continuous updates of the neural network 210 associated with these queries, etc.

The threshold response similarity value is a configurable value that specifies the minimum level of contextual similarity for the proxy server 100 to not refresh an entry in the vector database 120. For example, the threshold response similarity value can be set and/or adjusted for the web server 200 based on the percentage of cacheable entries that an owner (e.g., an enterprise) of the web server 200 wishes the vector database 120 to store, e.g., 80% or more, 85% or more, 90% or more, 95% or more cacheable entries. In general, higher threshold response similarity values reduce the percentage of cacheable entries in the vector database 120, while lower threshold response similarity values increase the percentage.

Note, the proxy server 100 can use various similarity metrics for the query and response similarity metrics, such as cosine similarities, inverse distance metrics, or both. Cosine similarities generally define the similarity of two vectors as the (normalized) scalar product between the two, e.g., such that two vectors with the same direction in the embedding space are equivalent. Inverse distance metrics generally define the similarity of two vectors as the inverse of the distance between the two vectors (e.g., a Euclidian distance or other p-norm), e.g., such that two vectors that point to the same position in the embedding space are equivalent. Such distance metrics can also be understood as error metrics (e.g., a mean-squared error).

Figure 3C:
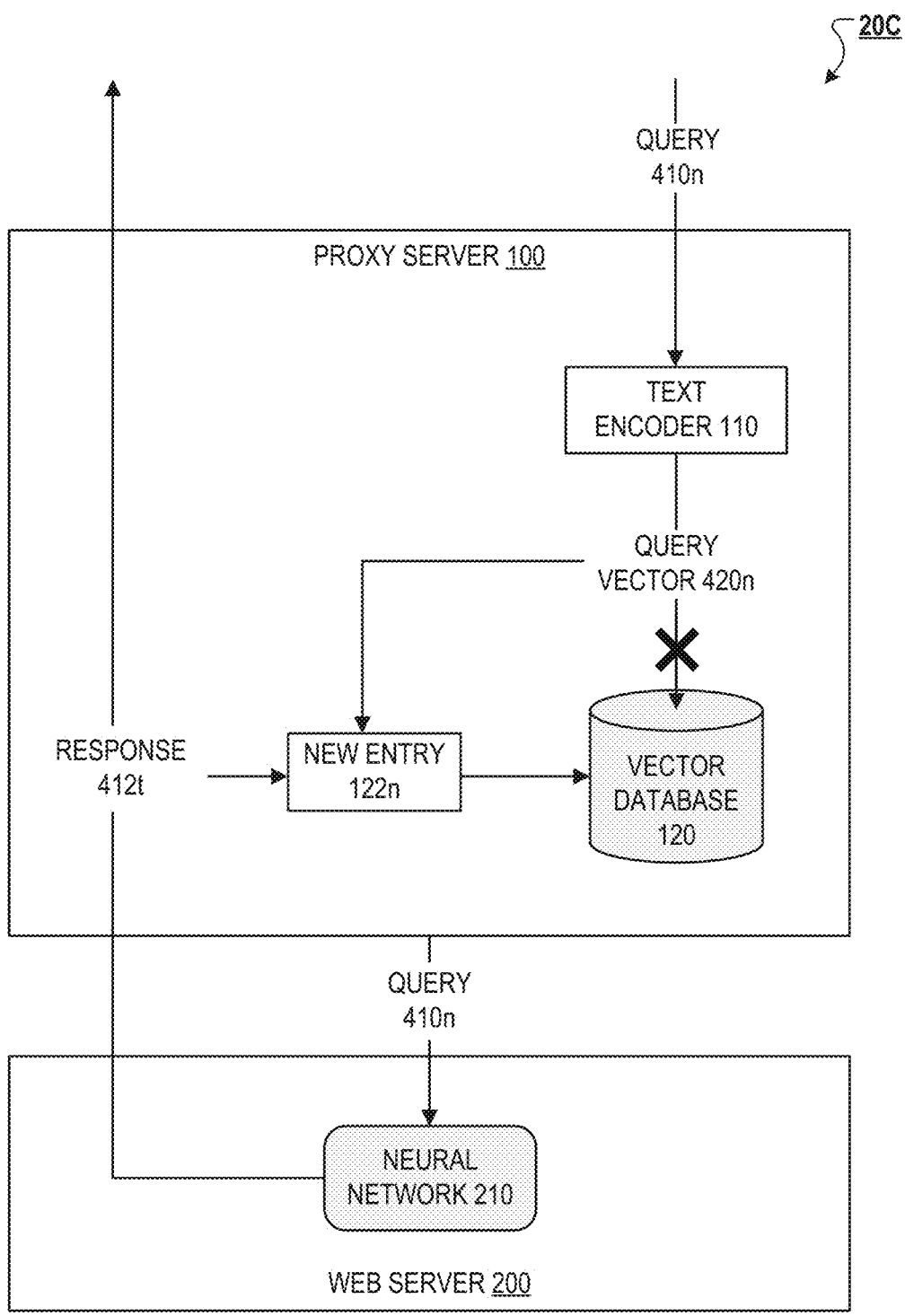

FIG. 3C is a schematic diagram showing an example protocol 20C for when the proxy server 100 does not register a hit in the vector database 120.

Here, the proxy server 100 receives a new query 410n from a client device 40. The proxy server 100 processes the new query 410n, using the text encoder 110, to generate an embedding vector 420n of the new query 410n. Proxy server 100 then performs a vector search on the vector database 120 with respect to the new query vector 420n. In this case, the proxy server 100 does not identify an entry in the vector database 120 that includes a query vector 420 that is similar to the new query vector 420n, as measured by a query similarity metric. The proxy server 100 then forwards the new query 410n to the web server 200. The proxy server 100 receives a true response 412t to the new query 410n, from the web server 200, that was generated by the neural network 210. The proxy server 100 then initializes a new entry 122n in the vector database 120 with the new query vector 420n and the true response 412t, and subsequently transmits the true response 412t to the client device 40.

Figure 4:
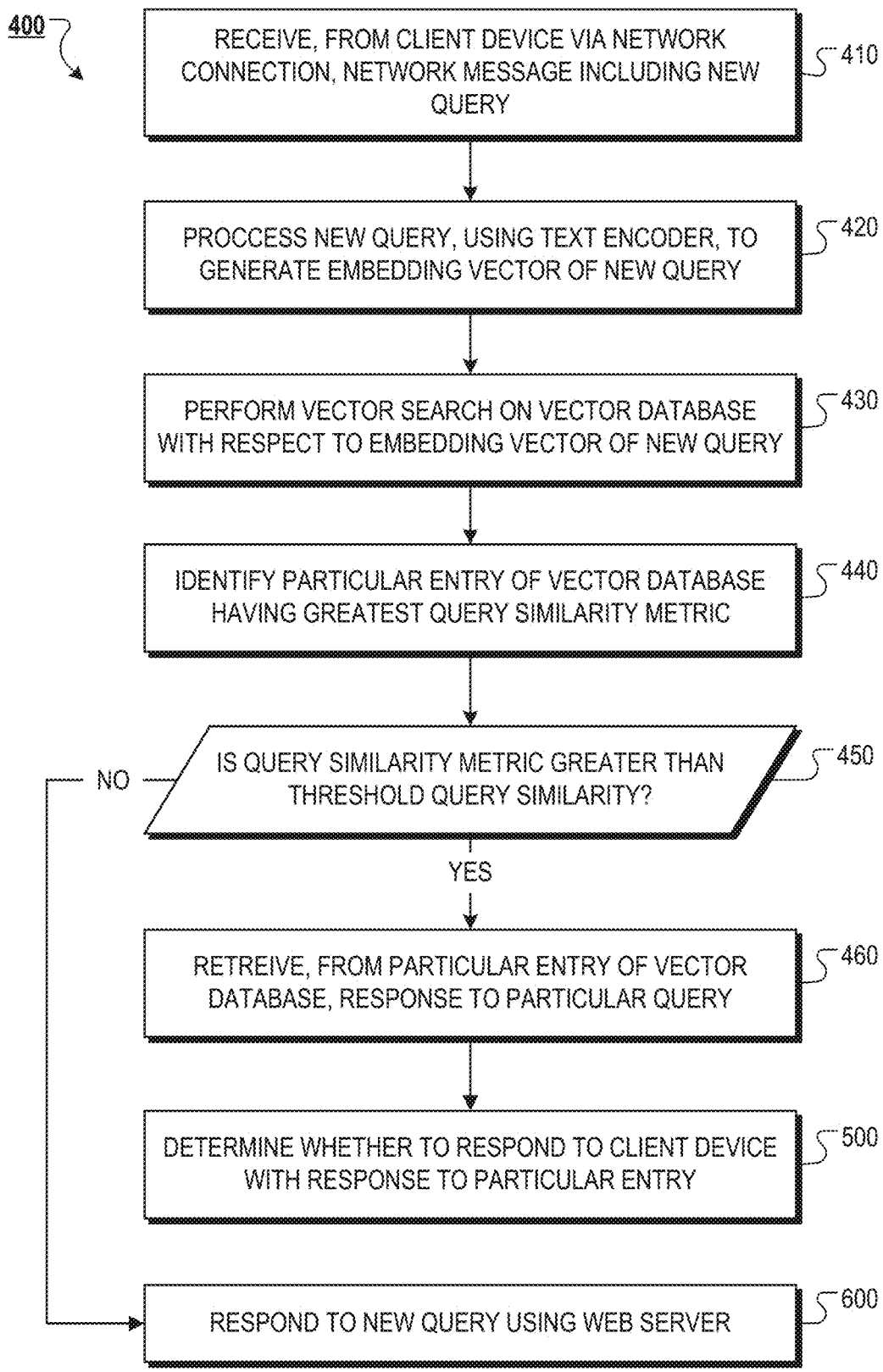
FIG. 4 shows a flow chart of an example process performed by a proxy server for managing network traffic to and from a web server hosting a neural network.

FIG. 4 shows a flow chart of an example process 400 for managing network traffic to and from a web server. For convenience, the process 400 will be described as being performed by a system of one or more computers located in one or more locations. For example, a proxy server, e.g., the proxy server 100 of FIG. 1, appropriately programmed in accordance with this specification, can perform the process 400. Accordingly, the following description of the process 400 is with respect to proxy server 100 and the operations performed by the proxy server 100 as described in the preceding sections.

The web server hosts natural language processing applications, e.g., GenAI applications. Particularly, the web server is configured to: (i) receive, from a client device, a query in a natural language, and (ii) generate a response to the query in the natural language. For example, the query can recite a question and the response to the query can recite an answer (or approximate answer) to the question. More generally, the query can recite a natural language processing task to be performed and the response to the query can recite one or more results (or approximate results) of the natural language processing task. In most cases, the web server hosts a neural network and is configured to process the query, using the neural network, to generate the response to the query. For example, the neural network can be a Transformer model, such as a large language model (LLM), that are generally adept at processing natural language data.

The process 400 commences when the proxy server receives, from the client device via a network connection, a network message including a new query for the server (410).

As mentioned above, the proxy server is communicatively coupled between the client device and the server. In some implementations, the proxy server acts as a reverse proxy (or surrogate proxy) for the web server. In these cases, the proxy server can establish the network connection using an internet protocol such as a Websocket or HTTPS protocol. For example, the client device can issue a request to establish the network connection with the web server, which is handled by the proxy server. The request can be a handshake request that includes: (i) a domain name of the web server, (ii) a hash key, and (iii) a network address (e.g., IP address) of the client device. Proxy server can then transmit, to the client device, a response to the request that establishes the network connection with the client device. For example, the proxy server can accept the request to establish the network connection based on, e.g., the network address of the client device. The response can be a handshake response that includes: (i) a hash value generated by the proxy server by hashing the hash key, and (ii) an upgrade prompt that upgrades the handshaking protocol to the network connection. The proxy server and client device can then communicate securely via the network connection by transmitting network messages to each other. The network connection is established in a network that includes the client device, the web server, and the proxy server. The network can also include one or more additional client devices and/or web servers. The network can be a wide area network (WAN) such as the internet or other appropriate network, e.g., a metropolitan area network (MAN), a campus area network (CAN), a local area network (LAN), etc.

Proxy server processes the new query, using a text encoder, to generate an embedding vector of the new query (420).

In some implementations, the text encoder is a pre-trained neural network, such as a T5 text encoder (e.g., T5-XXL) or a CLIP text encoder, which are generally adept at encoding the contextual information of natural language data.

Proxy server performs, with respect to the embedding vector of the new query, a vector search on a vector database (430). The vector database includes multiple entries that each include: (i) an embedding vector of a respective query, (ii) a corresponding response to the respective query, and (iii) a respective hit rate characterizing a frequency at which the respective response is retrieved from the entry.

In general, the entries are organized within the vector database according to the embedding vectors of their respective queries, e.g., such that entries including embedding vectors of queries that are similar to one another are positioned nearest one another. As mentioned above, the vector database can span a multidimensional array with the same dimension as the embedding space implemented by the text encoder. Hence, the vector search can be a k-nearest-neighbors search, such as a Hierarchical Navigable Small World (HNSW) search or an Inverted File Index (IVF) search, which can be performed by proxy server with high efficiency if the entries are appropriately organized within the vector database.

Proxy server identifies, from the vector search, a particular entry having a query similarity metric with a greatest respective value (440). The query similarity metric characterizes a similarity between: (i) the embedding vector of the new query, and (ii) an embedding vector of a particular query stored in the particular entry.

For example, the query similarity metric can be a cosine similarity, an inverse distance metric, or other appropriate similarity metric. Note, the entries in the vector database can be organized relative one another with respect to query similarity metrics between the embeddings of the respective queries stored in the entries. Hence, when the proxy server performs the vector search (e.g., a k-nearest-neighbors search) with respect to the embedding vector of the new query, the proxy server can iteratively evaluate neighboring entries until it converges to the particular entry with the greatest respective value.

Proxy server determines whether the query similarity metric is greater than a threshold query similarity value (450).

As mentioned above, the threshold query similarity value corresponds to the minimum contextual similarity for the proxy server to respond to the new query with a response stored in the vector database.

When the query similarity metric is greater than the threshold query similarity value:

Proxy server retrieves, from the particular entry of the vector database, a response to the particular query (460).

Proxy server then determines whether to respond to the client device with the response to the particular query (500), as described in greater detail below with respect to FIG. 5A.

Figure 5A:
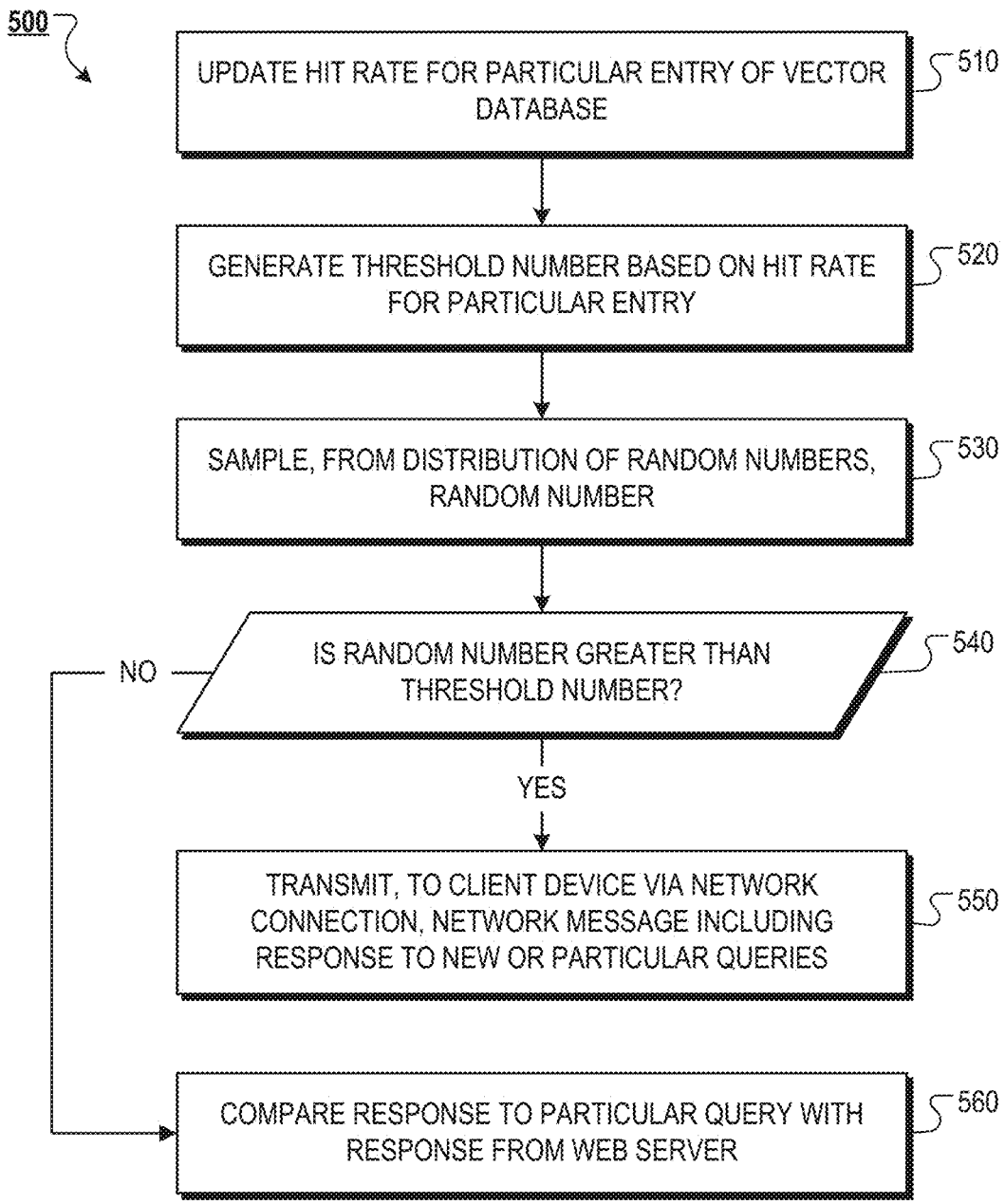
FIG. 5A shows a flow chart of an example process performed by a proxy server for determining whether to respond to a client device with a cached response.

FIG. 5A shows a flow chart of the process 500 performed by the proxy server for determining whether to respond to the client device with the response to the particular query. Proxy server updates a hit rate for the particular entry (510).

Proxy server generates a threshold number based on the hit rate for the particular entry (520).

For example, the threshold number can be inversely proportional to the hit rate for the particular entry. This allows the proxy server to adjust the fraction of contextually similar queries that are forwarded to the web server, e.g., if such contextually similar queries are frequently received by the proxy server.

Proxy server samples, from a distribution of random numbers, a random number (530).

Proxy server determines whether the random number is greater than the threshold number (540).

For example, the distribution of random numbers can be a uniform distribution from 0 to 1 and the threshold number can be a number between 0 and 1. In this case, the threshold number corresponds to the fraction of contextually similar queries that are forwarded to the web server when such queries register a hit in the vector database. For example, for a threshold number of 0.5, 50% of the contextually similar queries are forwarded to the web server. For a threshold number of 0.4, 40% of the contextually similar queries are forwarded to the web server. For a threshold number of 0.3, 30% of the contextually similar queries are forward to the web server, and so on.

When the random number is greater than the threshold number:

Proxy server transmits, to the client device via the network connection, a network message including the response to the particular query (550).

When the random number is not greater than the threshold number:

Proxy server compares the response to the particular query with a response generated from the web server (550), as described in greater detail below with respect to FIG. 5B.

Figure 5B:
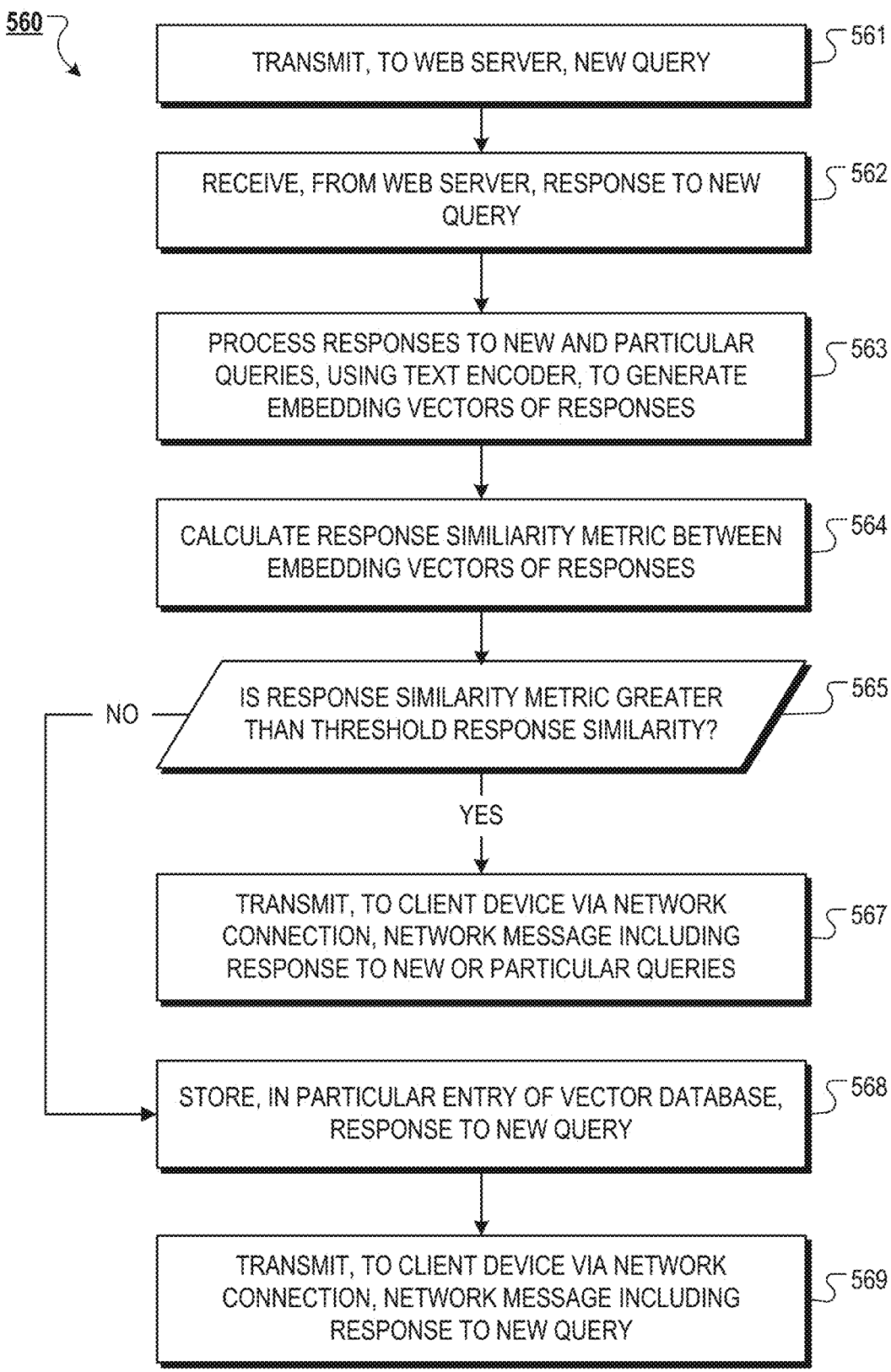
FIG. 5B shows a flow chart of an example process performed by a proxy server for comparing a cached response to a new response generated by a neural network hosted on a web server.

FIG. 5B shows a flow chart of the process 550 performed by the proxy server for comparing the response to the particular query with a response generated from the web server.

Proxy server transmits, to the web server, the new query (561).

Proxy server receives, from the web server, a response to the new query (562).

Proxy server processes the responses to the new and particular queries, using the text encoder, to generate embedding vectors of the responses to the new and particular queries (563).

Proxy server calculates a response similarity metric (564). The response similarity metric characterizes a similarity between: (i) the embedding vector of the response to the new query, and (ii) the embedding vector of the response to the particular query.

For example, the response similarity metric can be a cosine similarity, an inverse distance metric, or other appropriate similarity metric.

Proxy server determines whether the response similarity metric is greater than a threshold response similarity value (565).

As mentioned above, the threshold response similarity value specifies the minimum level of contextual similarity for the proxy server to not refresh the particular entry in the vector database.

When the response similarity metric is greater than the threshold response similarity value:

Proxy server transmits, to the client device, the response to the new or particular queries (567).

Since the responses are contextually similar, proxy server can decide whether to transmit the response to the new query or the response to the particular query.

When the response similarity metric is not greater than the threshold response similarity value:

Proxy server stores, in the particular entry of the vector database, the response to the new query (568).

In some implementations, proxy server also stores the embedding vector of the new query in the particular entry, e.g., to fully refresh the particular entry. These situations can be appropriate when the proxy server has adjusted the threshold query similarity value, e.g., to increase the sensitivity for responding to new queries with cached responses.

Proxy server transmits, to the client device, the response to the new query (569).

In some implementations, proxy server marks the particular entry of the vector database as non-cacheable, e.g., such that whenever the particular entry is identified in the vector database, a new query is automatically forwarded to the web server.

Returning to FIG. 4, when the query similarity metric is not greater than the threshold query similarity value:

Proxy server responds to the new query using the web server (600), as described in greater detail below with respect to FIG. 6.

Figure 6:
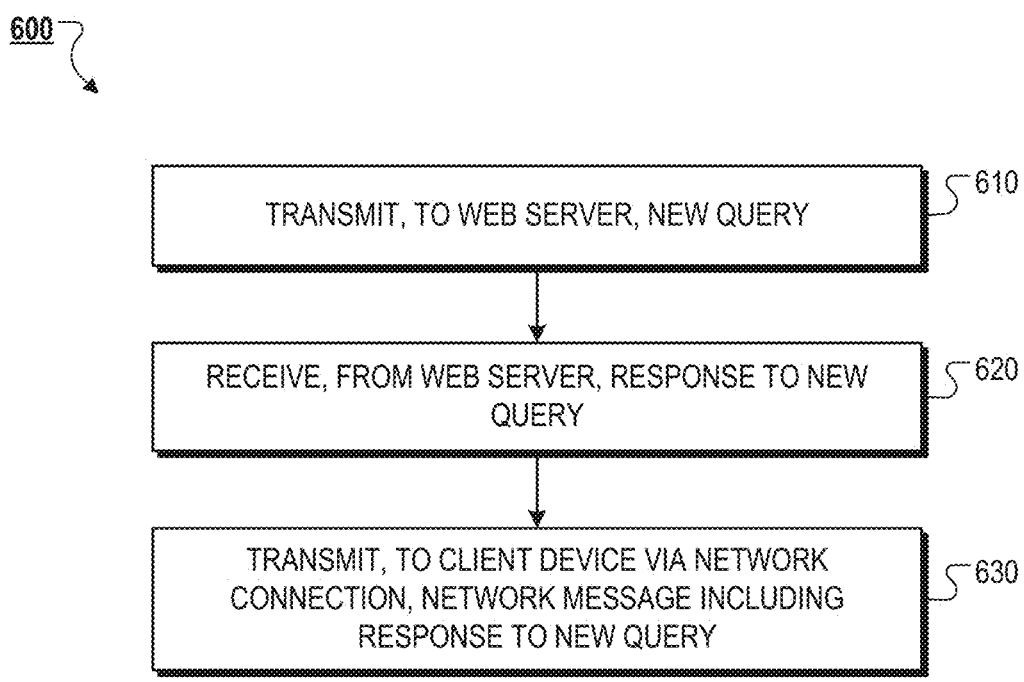
FIG. 6 shows a flow chart of an example process performed by a proxy server for responding to a client device using a neural network hosted on a web server.

FIG. 6 shows a flow chart of the process 600 for responding to the client device using the web server.

Proxy server transmits, to the web server, the new query (610).

Proxy server receives, from the web server, a response to the new query (620).

Proxy server stores, in a new entry of the vector database, (i) the embedding vector of the new query, and (ii) the response to the new query (630).

Proxy server transmits, to the client device via the network connection, a network message including the response to the new query (640).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for managing network traffic to and from a server configured to:
(i) receive, from a client device, a query in a natural language, and (ii) generate a response to the query in the natural language, the method comprising:
receiving, from the client device via a network connection, a network message comprising a new query for the server,
wherein the one or more computers are communicatively coupled to the server;
processing the new query, using a text encoder, to generate an embedding vector of the new query;
identifying, from amongst a plurality of entries of a vector database, a particular entry based on a similarity metric between: (i) the embedding vector of the new query, and (ii) an embedding vector of a particular query stored in the particular entry,
wherein each of the plurality of entries comprises: (i) an embedding vector of a respective query, and (ii) a corresponding response to the respective query;
determining whether the similarity metric is greater than a threshold similarity value;
based on determining that the similarity metric is greater than the threshold similarity value, sampling, from a distribution of random numbers, a random number;
determining whether the random number satisfies a threshold condition; and
based on determining that the random number satisfies the threshold condition,
transmitting, to the server, the new query,
receiving, from the server, a response to the new query,
processing the response to the new query and the response corresponding to the particular query, using the text encoder, to generate embedding vectors of the response to the new query and the response corresponding to the particular query,
calculating a second similarity metric between: (i) the embedding vector of the response to the new query and (ii) the embedding vector of the response corresponding to the particular query,
determining whether the second similarity metric is greater than a second threshold similarity value, and
based on determining that the second similarity metric is greater than the second threshold similarity value, sending the response to the new query or the response corresponding to the particular query to the client device.

2. The method of claim 1, wherein each of the plurality of entries further comprises a respective hit rate characterizing a frequency at which the respective response is retrieved from the entry.

3. The method of claim 2, further comprising, based on determining that the similarity metric is greater than the threshold similarity value, and before determining whether the random number satisfies the threshold condition:
updating a hit rate for the particular entry; and
generating a threshold number of the threshold condition based on the hit rate for the particular entry.

4. The method of claim 3, wherein generating the threshold number is performed such that the threshold number is inversely proportional to the hit rate for the particular entry.

5. The method of claim 1, wherein the distribution of random numbers is a uniform distribution.

6. The method of claim 1, wherein identifying, from amongst the plurality of entries of the vector database, the particular entry based on the similarity metric comprises:
performing, with respect to the embedding vector of the new query, a vector search on the embedding vectors of the queries stored in the plurality of entries; and
identifying, from the vector search, the particular entry as the respective entry having the similarity metric with a greatest respective value.

7. The method of claim 6, wherein the vector search is a k-nearest-neighbors search.

8. The method of claim 1, further comprising, upon determining that a third similarity metric corresponding to a second new query is not greater than the threshold similarity value:
transmitting, to the server, the second new query;
receiving, from the server, a response to the second new query;
storing, in a new entry of the vector database, (i) the embedding vector of the second new query, and (ii) the response to the second new query; and
transmitting, to the client device via the network connection, a network message comprising the response to the second new query.

9. The method of claim 1, wherein the server hosts a neural network and is configured to process the query, using the neural network, to generate the response to the query.

10. The method of claim 9, wherein the neural network hosted on the server is a large language model.

11. The method of claim 1, wherein the text encoder is a pre-trained neural network.

12. A system comprising one or more computers and one or more storage devices communicatively coupled to the one or more computers, wherein the one or more storage devices store instructions that, when executed by the one or more computers, cause the one or more computers to perform operations of a method for managing network traffic to and from a server configured to: (i) receive, from a client device, a query in a natural language, and (ii) generate a response to the query in the natural language, the method comprising:
receiving, from the client device via a network connection, a network message comprising a new query for the server,
wherein the one or more computers are communicatively coupled to the server;
processing the new query, using a text encoder, to generate an embedding vector of the new query;
identifying, from amongst a plurality of entries of a vector database, a particular entry based on a similarity metric between: (i) the embedding vector of the new query, and (ii) an embedding vector of a particular query stored in the particular entry,
wherein each of the plurality of entries comprises: (i) an embedding vector of a respective query, and (ii) a corresponding response to the respective query;
determining whether the similarity metric is greater than a threshold similarity value;
based on determining that the similarity metric is greater than the threshold similarity value, sampling, from a distribution of random numbers, a random number;
determining whether the random number satisfies a threshold condition; and
based on determining that the random number satisfies the threshold condition,
transmitting, to the server, the new query,
receiving, from the server, a response to the new query,
processing the response to the new query and the response corresponding to the particular query, using the text encoder, to generate embedding vectors of the response to the new query and the response corresponding to the particular query,
calculating a second similarity metric between: (i) the embedding vector of the response to the new query and (ii) the embedding vector of the response corresponding to the particular query,
determining whether the second similarity metric is greater than a second threshold similarity value, and
based on determining that the second similarity metric is greater than the second threshold similarity value, sending the response to the new query or the response corresponding to the particular query to the client device.

13. The system of claim 12, wherein the method further comprises, upon determining that a third similarity metric corresponding to a second new query is not greater than the threshold similarity value:
transmitting, to the server, the second new query;
receiving, from the server, a response to the second new query;
storing, in a new entry of the vector database, (i) the embedding vector of the second new query, and (ii) the response to the second new query; and
transmitting, to the client device via the network connection, a network message comprising the response to the second new query.

14. One or more non-transitory computer storage media storing instructions that, when executed by one or more computers, cause the one or more computers to perform operations of a method for managing network traffic to and from a server configured to: (i) receive, from a client device, a query in a natural language, and (ii) generate a response to the query in the natural language, the method comprising:
receiving, from the client device via a network connection, a network message comprising a new query for the server,
wherein the one or more computers are communicatively coupled to the server;
processing the new query, using a text encoder, to generate an embedding vector of the new query;
identifying, from amongst a plurality of entries of a vector database, a particular entry based on a similarity metric between: (i) the embedding vector of the new query, and (ii) an embedding vector of a particular query stored in the particular entry,
wherein each of the plurality of entries comprises: (i) an embedding vector of a respective query, and (ii) a corresponding response to the respective query;
determining whether the similarity metric is greater than a threshold similarity value;
based on determining that the similarity metric is greater than the threshold similarity value, sampling, from a distribution of random numbers, a random number;
determining whether the random number satisfies a threshold condition; and
based on determining that the random number satisfies the threshold condition,
transmitting, to the server, the new query,
receiving, from the server, a response to the new query,
processing the response to the new query and the response corresponding to the particular query, using the text encoder, to generate embedding vectors of the response to the new query and the response corresponding to the particular query,
calculating a second similarity metric between: (i) the embedding vector of the response to the new query and (ii) the embedding vector of the response corresponding to the particular query,
determining whether the second similarity metric is greater than a second threshold similarity value, and
based on determining that the second similarity metric is greater than the second threshold similarity value, sending the response to the new query or the response corresponding to the particular query to the client device.

15. The one or more non-transitory computer storage media of claim 14, wherein the method further comprises, based on determining that a third second similarity metric corresponding to a second new query is not greater than the threshold similarity value:
transmitting, to the server, the second new query;
receiving, from the server, a response to the second new query;
storing, in a new entry of the vector database, (i) the embedding vector of the second new query, and (ii) the response to the second new query; and
transmitting, to the client device via the network connection, a network message comprising the response to the second new query.

* * * * *